(12) United States Patent
Osakabe

(10) Patent No.: US 7,492,682 B2
(45) Date of Patent: Feb. 17, 2009

(54) OPTICAL DISK RECORDING APPARATUS CONTROLLABLE BY TABLE OF MULTI-PULSE PATTERNS

(75) Inventor: Katsuichi Osakabe, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 423 days.

(21) Appl. No.: 10/626,141

(22) Filed: Jul. 24, 2003

(65) Prior Publication Data
US 2004/0145985 A1 Jul. 29, 2004

(30) Foreign Application Priority Data
Jul. 25, 2002 (JP) ............................. 2002-216991

(51) Int. Cl.
*G11B 15/52* (2006.01)
(52) U.S. Cl. .................................................. 369/47.53
(58) Field of Classification Search ...................... None
See application file for complete search history.

(56) References Cited

U.S. PATENT DOCUMENTS

| | | | | |
|---|---|---|---|---|
| 5,367,514 | A * | 11/1994 | Kobayashi et al. | 369/47.51 |
| 5,732,062 | A * | 3/1998 | Yokoi et al. | 369/116 |
| 5,818,808 | A | 10/1998 | Takada | |
| 6,044,055 | A * | 3/2000 | Hara | 369/116 |
| 6,704,269 | B1 * | 3/2004 | Ogawa | 369/116 |
| 6,999,393 | B2 | 2/2006 | Yamada | |
| 7,061,847 | B2 * | 6/2006 | Sasa et al. | 369/59.11 |
| 2001/0028617 | A1 | 10/2001 | Mashimo | |
| 2003/0112732 | A1 | 6/2003 | Masui et al. | |
| 2004/0052176 | A1 * | 3/2004 | Narumi et al. | 369/47.39 |

FOREIGN PATENT DOCUMENTS

| | | |
|---|---|---|
| EP | 0802531 | 10/1997 |
| JP | 08-180413 | 7/1996 |
| JP | 10-091961 | 4/1998 |
| JP | 11232652 | 8/1999 |
| JP | 2002-230764 | 8/2002 |
| JP | 2003-141726 | 5/2003 |
| WO | WO-02/17308 | 2/2002 |

OTHER PUBLICATIONS

Japanese Decision of Rejection, dated Aug. 28, 2007.

* cited by examiner

*Primary Examiner*—Joseph Feild
*Assistant Examiner*—Parul Gupta
(74) *Attorney, Agent, or Firm*—Morrison & Foerster LLP

(57) ABSTRACT

An optical disk recording apparatus is designed for forming pits on a recording surface of an optical disk of a given type at a given recording speed by applying a laser light in the form of a sequence of multiple pulses obtained by intermittently turning on and off the laser light according to a given multi-pulse pattern. In the apparatus, a write strategy circuit is set with a pattern table and controls the turning on and off of the laser light according to a multi-pulse pattern selected from the pattern table in correspondence to a length of the pit to be formed. A storage section stores a plurality of pattern tables of different kinds, each pattern table containing a plurality of multi-pulse patterns corresponding to a plurality of lengths of the pit. A control section selects one of the pattern tables based on either of the recording speed and the type of the optical disk, and reads out the selected pattern table from the storage section and sets the read pattern table in the write strategy circuit.

20 Claims, 7 Drawing Sheets

OPTICAL DISK RECORDING APPARATUS CONTROLLABLE BY TABLE OF MULTI-PULSE PATTERNS

BACKGROUND OF THE INVENTION

1. Technical Field of the Invention

The present invention relates to an optical disk recording apparatus and, more particularly, to an improvement of write control (write strategy) of a CD-RW drive.

2. Prior Art

In a CD-RW, a phase-transition material is used for a recording layer, and when heated and then rapidly cooled, the phase-transition material is phase-changed from a crystalline state to an amorphous state to form pits. In addition, when the phase-transition material is heated and gradually cooled, the pits phase-changed into the amorphous state are returned to the crystalline state to thereby accomplish erasing of pits.

The crystalline and amorphous states are different in reflectivity by about 15 percent, which thus enables record/erase of information in the form of pits.

The recording layer is heated by applying a laser light, but in this case, there exists a disadvantage that, during writing, the rapid cooling is not satisfactorily achieved when a high power (write power) laser light is continuously applied and the recording layer that has been made amorphous once is turned again to the crystalline state, resulting in failure to form the pits. Now, write control (write strategy) of the CD-RW is performed, as shown in FIG. 7(A), by a multi-pulse method in which a laser light of write power is intermittently applied in a pulsed manner and the power level is lowered to bottom power between pulses to help the recording layer be cooled down rapidly.

A conventional CD-RW drive employs such a 1T multi-pulse write strategy that one cycle of a pulse (pulse width+pulse interval) corresponds to one clock cycle (1T) of EFM.

Furthermore, in cooling the recording layer, the electric current of a semiconductor laser diode is not completely cut off but is made to flow at bottom power so that a rise to the next write power may be promptly performed. In addition, for overwrite, portions where the pits are not to be formed (portions which become lands) are irradiated with a laser light of erase power to erase the old pits.

On the other hand, with a writing speed of writing information into the CD-RW becoming higher, 10 times to 24 times writing speed is required. When writing is performed at 24 times speed, a temporal length for 1T is about 9.6 nS. In the meantime, times needed for the semiconductor laser to turn on (a rise from bottom power to write power) and to turn off (a fall from write power to bottom power) are both about 2 nS. Therefore, when the write strategy for 1T multi-pulse is performed at 24 times speed to raise a pulse of 0.5T width, the pulse finishes before laser power rises as shown in FIG. 7(B), which thus causes a problem that good pits cannot be formed.

One possible idea to cope with this problem is to make a pulse cycle longer, but when the pulse cycle is made longer than 1T, a bit length might not synchronize with the pulse cycle, which means, for example, that a 3T-pit cannot be formed on a 2T-cycle, thus leading to a problem that a simple multi-pulse train does not allow pits having a correct length to be formed. Further, another problem is that the write strategy of the multi-pulse on a long pulse cycle does not enable pits having a good shape to be formed at about 1 to 10 times low recording speed.

SUMMARY OF THE INVENTION

An object of this invention is to provide an optical disk recording apparatus capable of forming good pits on an optical disk such as a CD-RW both in low speed recording and high speed recording.

An inventive optical disk recording apparatus is designed for forming pits on a recording surface of an optical disk of a given type at a given recording speed by applying a laser light in the form of a sequence of multiple pulses obtained by intermittently turning on and off the laser light according to a given multi-pulse pattern. The inventive apparatus comprises a write strategy circuit that is set with a pattern table and controls the turning on and off of the laser light according to a multi-pulse pattern selected from the pattern table in correspondence to a length of the pit to be formed, a storage section that stores a plurality of pattern tables of different kinds, each pattern table containing a plurality of multi-pulse patterns corresponding to a plurality of lengths of the pit, and a control section that selects one of the pattern tables based on either one or both of the recording speed and the type of the optical disk, and that reads out the selected pattern table from the storage section and sets the read pattern table in the write strategy circuit.

Another inventive optical disk recording apparatus is designed for forming pits on a recording surface of an optical disk of a given type at a given recording speed by applying a laser light in the form of a sequence of multiple pulses obtained by intermittently turning on and off the laser light according to a given multi-pulse pattern while rotating the optical disk at a constant angular velocity such that a linear velocity of the optical disk varies. The inventive apparatus comprises a write strategy circuit that is set with a pattern table and controls the turning on and off of the laser light according to said linear velocity and a multi-pulse pattern selected from the pattern table in correspondence to a length of the pit to be formed, a storage section that stores a plurality of pattern tables of different kinds, each pattern table containing a plurality of multi-pulse patterns corresponding to a plurality of lengths of the pit; and a control section that is provided for selecting one of the pattern tables based on either one or both of the recording speed and the type of the optical disk and based on the varying linear velocity of the optical disk, and for reading out the selected pattern table from the storage section and setting the read pattern table in the write strategy circuit.

Preferably, the storage section stores the plurality of the pattern tables in correspondence to a plurality of basic cycles of turning on and off the laser light, such that each pattern table contains the plurality of the multi-pulse patterns, all of which are arranged according to the basic cycle allotted to each pattern table and in matching with the plurality of the lengths of the pit.

Preferably, the storage section stores a 1T pattern table corresponding to the basic cycle of 1T, so that the 1T pattern table enables the write strategy circuit to control the turning on and off of the laser light according to the basic cycle of 1T, and stores a 2T pattern table corresponding to the basic cycle of 2T, so that the 2T pattern table enables the write strategy circuit to control the turning on and off of the laser light according to the basic cycle of 2T.

Preferably, the control section periodically monitors a change in the recording speed during the forming of the pits, and selects the pattern table in response to the monitored change of the recording speed to thereby dynamically set the selected pattern table in the write strategy circuit.

Preferably, the control section performs a first test recording with using the 1T pattern table to evaluate a quality of recording and a second test recording with using the 2T pattern table to evaluate a quality of recording separately from the first test recording before performing an actual recording, and selects one of the 1T pattern table and the 2T pattern table based on the respective qualities evaluated by the first test recording and the second test recording.

Preferably, the storage section stores the multi-pulse patterns that have cycles of turning on and off the laser light ranging from 0.5T cycle through 3T cycle. In such a case, the control section performs different sessions of test recording separately from each other with using the respective multi-pulse patterns having the cycles ranging from 0.5T through 3T to evaluate respective qualities of the different sessions of the test recording before an actual recording, and selects one of the multi-pulse patterns having the cycles ranging from 0.5T through 3T based on the respective qualities evaluated by the different sessions of the test recording.

In this invention, heating and rapid cooling are repeated by intermittently applying a laser light shorter than a pit to be formed as a multi-pulse, thereby forming pits having a predetermined length on the recording surface of the optical disk. A pulse width which is a heating period for applying the laser light with write power and a pulse interval which is a cooling period for turning off the laser light with bottom power are combined to determine a multi-pulse pattern in which pits having a desired length are formed for each pit length (3T to 11T in the case of EFM of a CD), thereby forming a multi-pulse pattern table. A plurality of multi-pulse pattern tables each having different patterns is produced and stored in the storage section. When pits are formed on an optical disk, that is, when information is recorded, one is selected from the above plurality of multi-pulse pattern tables on the basis of one or both conditions: a kind of optical disk, and a recording speed at which information is recorded on this optical disk. This means that a multi-pulse pattern may be selected in which the best pits are formed in accordance with the media kind and the recording speed. By recording information in this multi-pulse pattern, it is possible to produce a recorded optical disk having a good record quality.

It should be noted that in a recording method such as CAV, partial CAV or zone CLV where the recording speed (linear velocity) is changed during recording, the control section may monitor a change in the recording speed during recording, and may change the selection of the multi-pulse pattern table in accordance with the change in the recording speed. In other words, when the selection of the multi-pulse pattern table is switched in accordance with the change in the recording speed, a multi-pulse pattern table thus newly selected is read from the storage section and set in the write strategy circuit. In this way, it is always possible to record information (form pits) by means of an optimum write strategy even in the recording method where the recording speed is changed.

DETAILED DESCRIPTION OF THE INVENTION

An optical disk recording apparatus in accordance with an embodiment of this invention will be described in reference to the drawings. A CD-RW drive which writes and erases data in and from a CD-RW will be described as an example in this embodiment.

Figure 1:
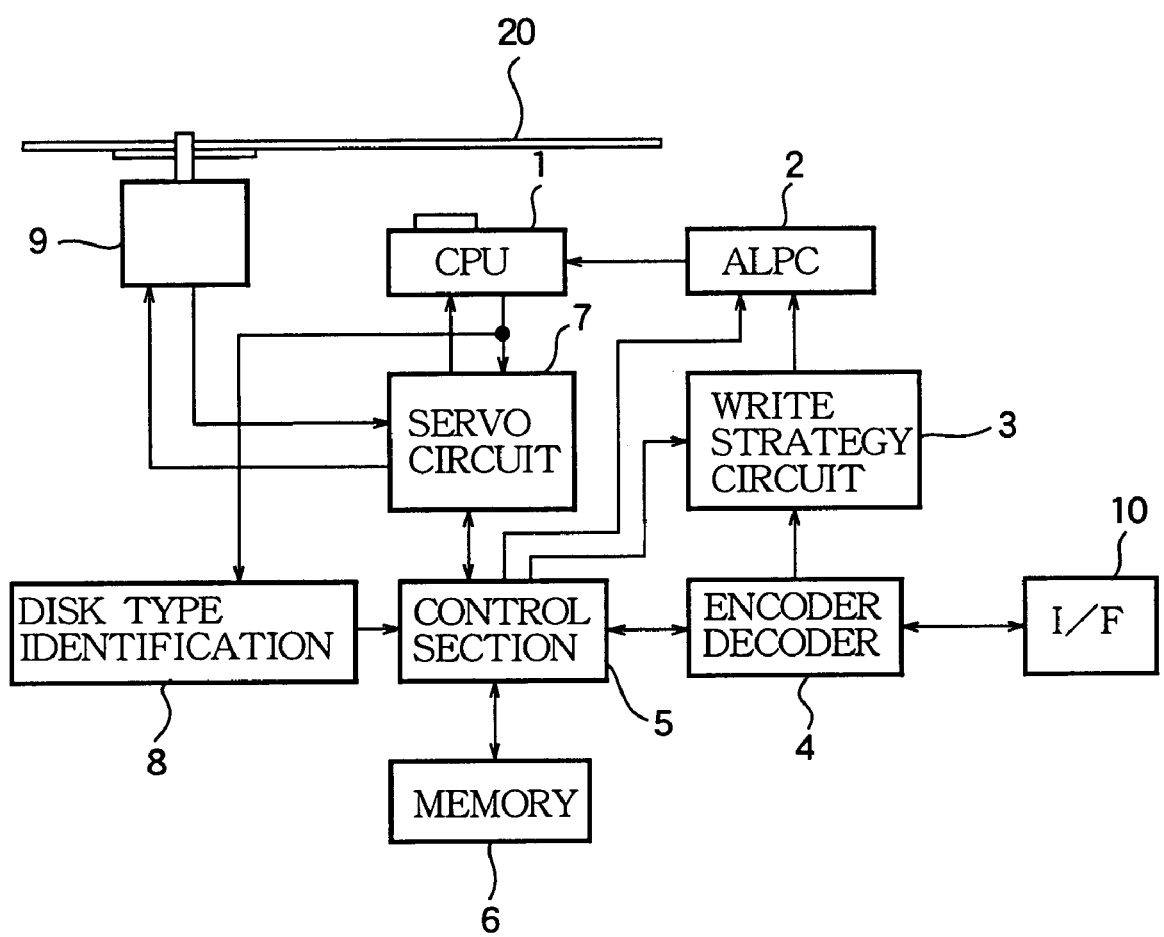
FIG. 1 is a block diagram of an optical disk recording apparatus according to an embodiment of this invention.

FIG. 1 is a schematic block diagram of the CD-RW drive. A disk 20, which is a CD-RW, is rotated at a predetermined rotation speed by a spindle motor 9. An optical system 1 faces a recording surface of the disk 20. The optical system 1 has a built-in semiconductor laser. This semiconductor laser emits light with predetermined power and in a predetermined multi-pulse pattern under the control of an ALPC (Automatic Laser Power Controller) 2, a write strategy circuit 3 and an encoder/decoder 4, and irradiates the recording surface of the disk 20 with the pulsed laser light.

A servo control circuit 7 controls the rotation speed of the spindle motor 9, a position in a radial direction of the disk of the optical system 1, and a focus of the laser light. More specifically, the servo control circuit 7 comprises a spindle (rotation) servo circuit, a tracking servo circuit, a feed servo circuit and a focusing servo circuit, and the servo circuits each control the spindle motor 9, a tracking actuator (not shown), a feed motor (not shown) and a focusing actuator (not shown).

Data to be written into the disk 20, which is the CD-RW, is input to the encoder/decoder 4 via an interface 10. When the data to be written is input from the interface 10, the encoder/decoder 4 adds EDC/ECC and applies CIRC processing to the data, and further applies EFM modulation to thereby input the data into the write strategy circuit 3. The multi-pulse pattern table for forming pits with each pit length (3T to 1T) of the EFM modulated-data is set in the write strategy circuit 3. When the EFM modulated-data is input from the encoder/decoder 4, write strategy processing is performed on the basis of the multi-pulse pattern table so as to form 3T to 11T pits/lands of the EFM data, and a laser power control signal to control power levels of write power, bottom power and erase power is output. The ALPC 2 controls an electric current to be input to a semiconductor laser diode so that the semiconductor laser diode emits laser lights with predetermined powers according to the laser power control signal. The actual power levels of the write power, bottom power and erase power are each controlled properly on the basis of the recording speed, OPC and the like.

In addition, temporal pit lengths of 3T to 11T change in accordance with (in inverse proportion to) the recording speed, and the write strategy circuit 3 extends and shortens a time axis of the multi-pulse pattern on the basis of recording speed information input from a control section 5 so that the pulse width and pulse interval correspond to the recording speed.

When the disk 20 is set on the apparatus, attribute information of this disk 20 is read by preloading, and a disk type identification section 8 identifies the kind or type of the disk on the basis of the attribute information. The disk type is then input to the control section 5. Also, various kinds of commands are input to the control section 5 from a host device via the interface 10. When a recording command is input to the control section 5, the control section 5 decides a write strategy on the basis of recording speed determination information contained in the recording command and on the basis of the disk type detected by preloading. Namely, the control section 5 selects a multi-pulse pattern table and reads the multi-pulse pattern table from a memory 6 to set it in the write strategy circuit 3. Also, OPC is performed immediately before recording, and an optimum value of the write power is obtained, which is then set in the ALPC 2.

After this, data to be recorded is input from the interface 10, and then the data is converted in an EFM form so as to be recorded in the disk 20. The memory 6 may store a program for use in the optical disk recording apparatus designed for forming pits on a recording surface of an optical disk of a given type at a given recording speed by applying a laser light in the form of a sequence of multiple pulses obtained by intermittently turning on and off the laser light according to a given multi-pulse pattern. The program is executable by the optical disk recording apparatus for performing a method comprising a write strategy process settable with a pattern table and capable of controlling the turning on and off of the laser light according to a multi-pulse pattern selected from the pattern table in correspondence to a length of the pit to be formed, a storage process of storing a plurality of pattern tables of different kinds in a storage, each pattern table containing a plurality of multi-pulse patterns corresponding to a plurality of lengths of the pit, and a control process of selecting one of the pattern tables based on either of the recording speed or the type of the optical disk, or both, and retrieving the selected pattern table from the storage and setting the read pattern table in the write strategy process.

Figure 2:
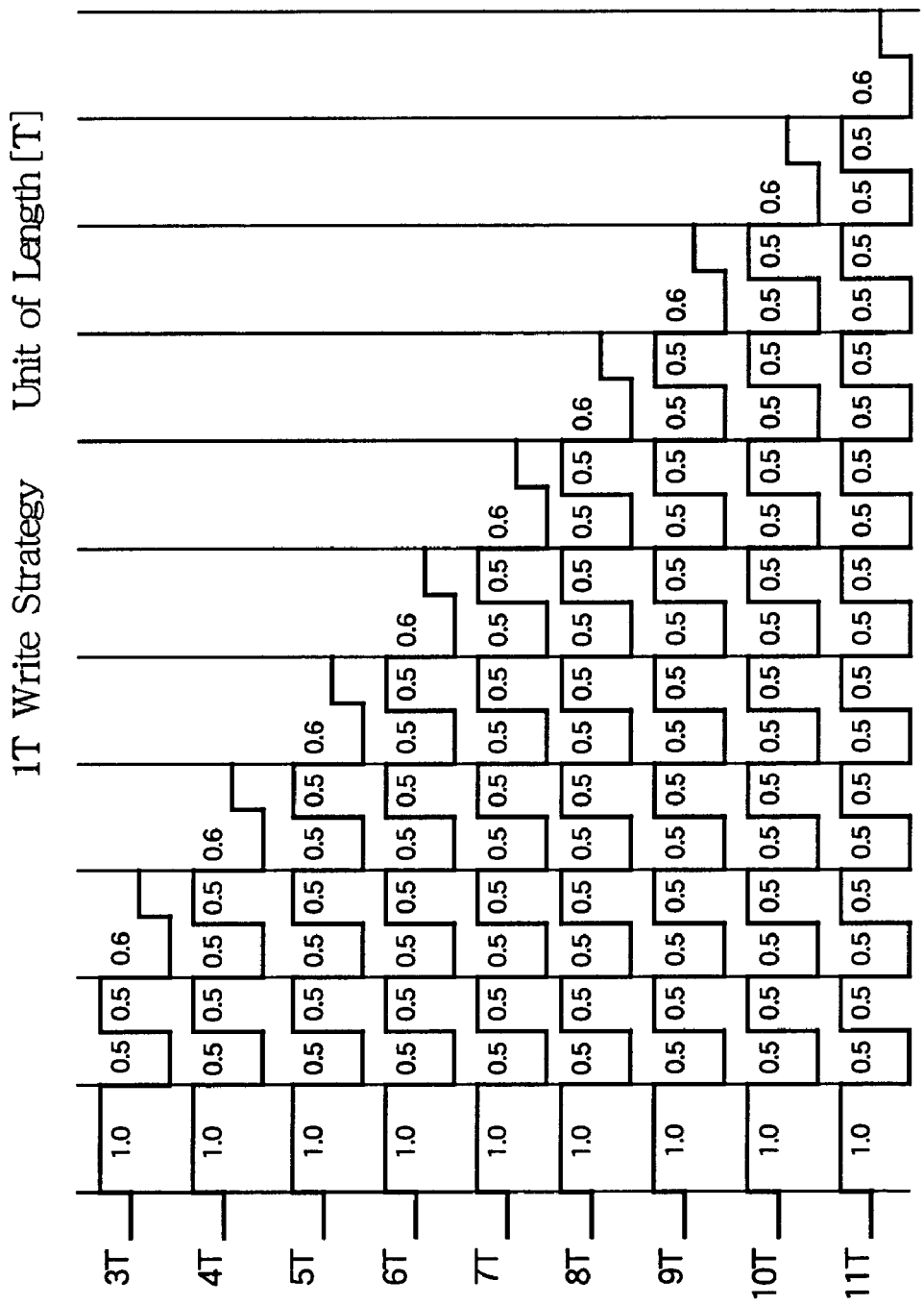
FIG. 2 is a diagram showing the content of a 1T multi-pulse pattern table applied to the optical disk recording apparatus.
Figure 3:
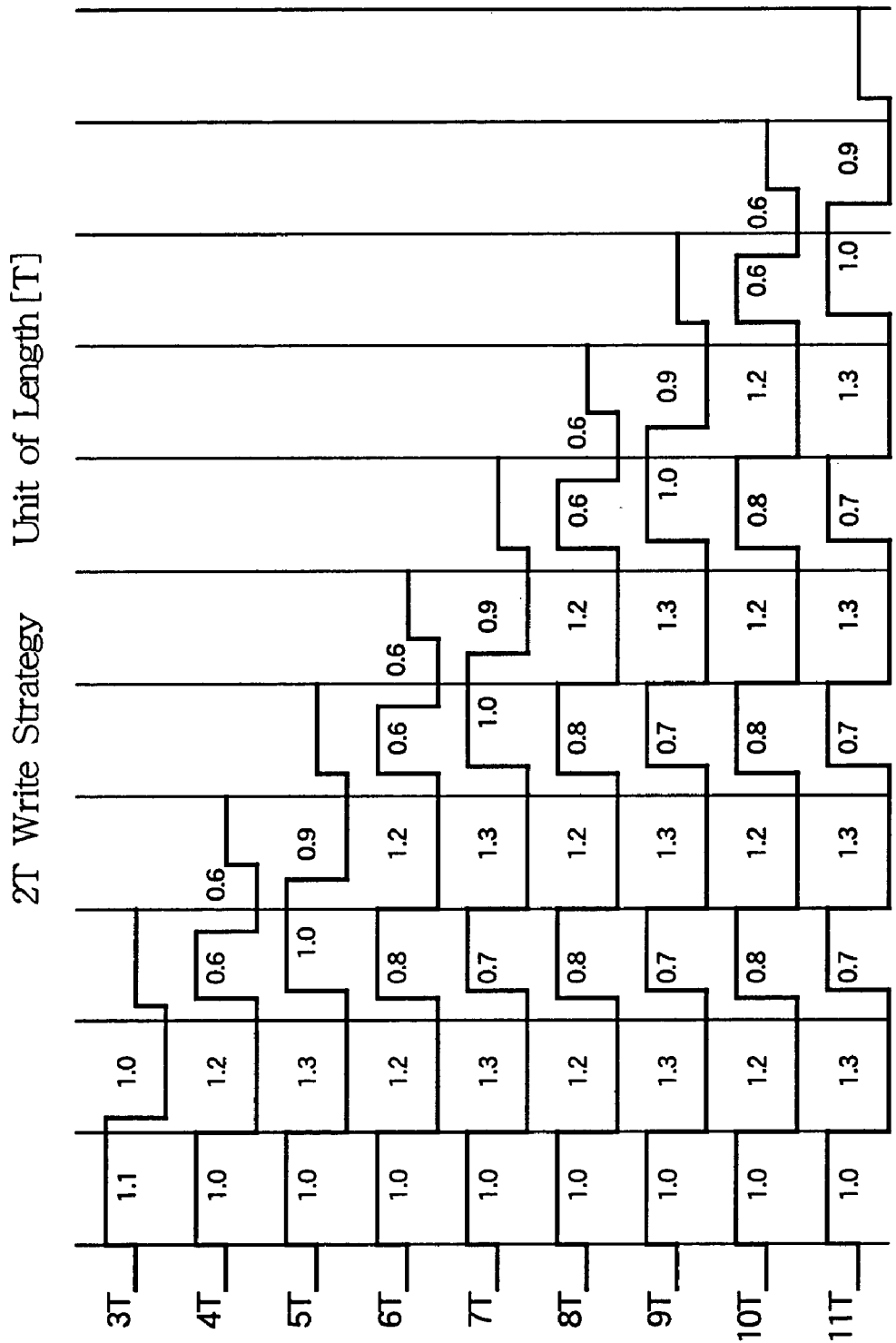
FIG. 3 is a diagram showing the content of a 2T multi-pulse pattern table applied to the optical disk recording apparatus.

Here, the memory 6 stores plural kinds of multi-pulse pattern tables. The multi-pulse pattern tables are as shown in FIG. 2 and FIG. 3 Patterns having an optimum pulse width and pulse interval to form pits of 3T to 11T are set in the multi-pulse pattern tables, and multi-pulse patterns each based on different pulse cycles (pulse width+pulse interval) are stored in the respective multi-pulse pattern tables. FIG. 2 shows a 1T multi-pulse pattern table (1T cycle write strategy) based on a basic cycle of 1T, and FIG. 3 shows a 2T multi-pulse pattern table (2T cycle write strategy) based on a basic cycle of 2T. The nT multi-pulse pattern described in this invention is that the multi-pulse pattern is generated based on the period of the nT pulse ((n/2)T period of the pulse+(N/2)T period of the space between pulses), and T is the basic period of the encoder clock on the basic writing speed.

In the multi-pulse patterns based on the 1T cycle shown in FIG. 2, about the same cycle patterns are used to form pits having any length. In other words, such a pattern is repeated in which the laser is turned on during a first 1T period, and then turned off (to bottom power) for 0.5T, and turned on (to write power) for 0.5T. After the laser is turned off for 0.6T only during the last 1T period, transition is made to the erase power 0.4T before the end of a pit section.

Furthermore, the same is applied to the multi-pulse pattern based on the 2T cycle shown in FIG. 3 in that the laser is turned on for a first 1T (1.1T only in 3T pit) in all the pit lengths, but after that, the pulse interval and pulse width are formed in various patterns in conformity to the respective pit lengths. Since the basic pulse cycle is longer than 1T, the cycle might not correspond in some pit lengths. Therefore, various pulse widths and pulse intervals are used so that all the pits of 3T to 11T can be formed accurately. For example, when 3T pit is formed, the laser power is first changed (to write power) in a pulse width of 1.1T, and then changed (to bottom power) only for 1.0T. After that (although 0.9T remains before 3T ends), control is performed with erase power. By controlling a bottom power part and erase power part in this way, remaining heat in a write power part is controlled so that the 3T pit will be formed.

Figure 4:
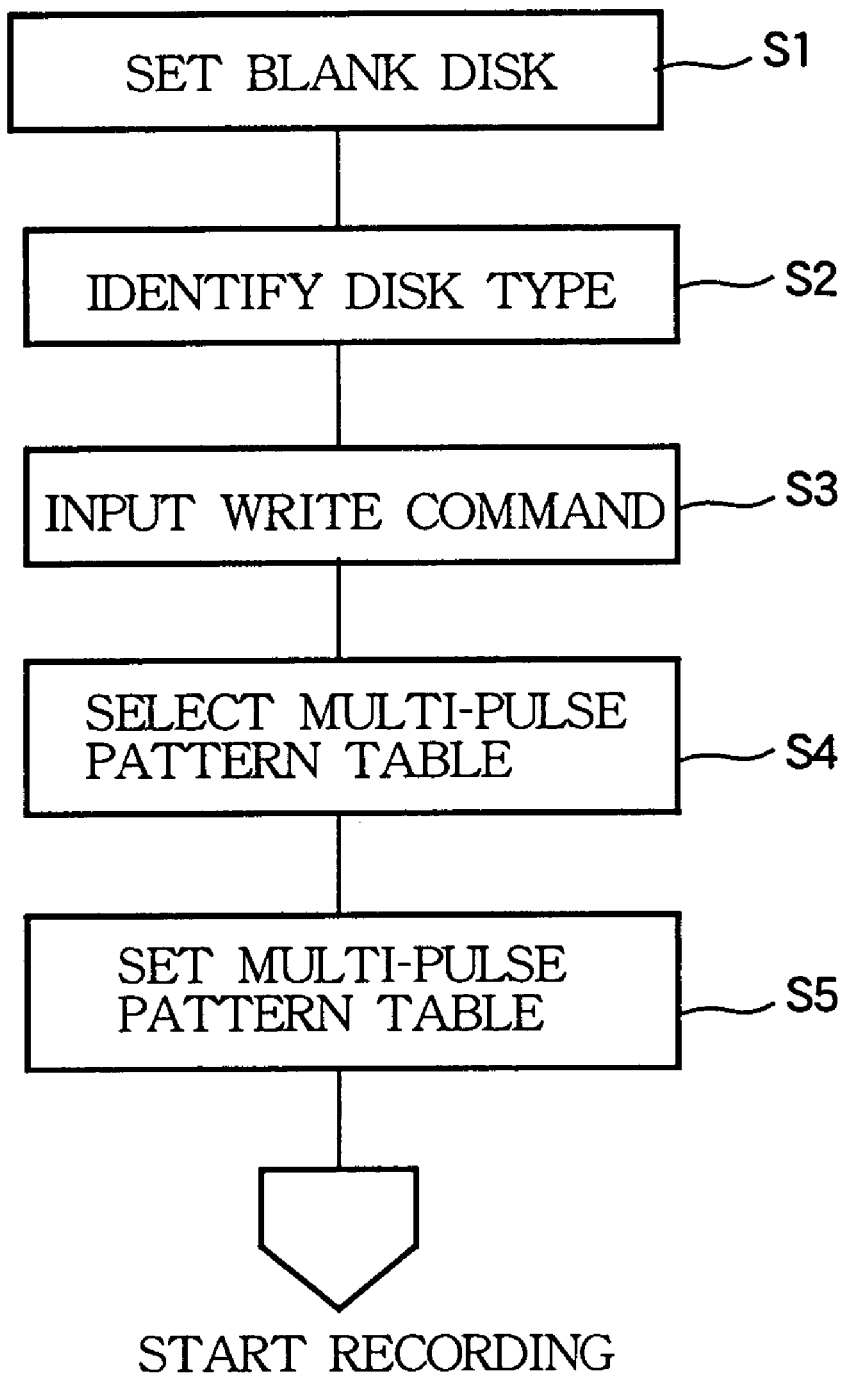
FIG. 4 is a flowchart showing an operation of a control section of the optical disk recording apparatus.

FIG. 4 is a flowchart showing a basic operation of the control section 5. In accordance with this operation, one of the 1T multi-pulse pattern table or 2T multi-pulse pattern table is selected on the basis of the recording speed and the disk type. When the blank disk 20 which is a CD-RW is set on the apparatus (s1), the kind of disk is identified by preloading (s2), which is retained in an internal memory of the control section 5. The control section 5 is on standby until a recording command is input from a host device connected via the interface 10. When the recording command is input (s3), one of the 1T multi-pulse pattern table or 2T multi-pulse pattern table is selected on the basis of the recording speed determination information contained in the recording command and the disk type identified during the preload (s4), and the selected multi-pulse pattern table is read from the memory 6, which is then set in the write strategy circuit 3 (s5).

After that, when data to be recorded is input via the interface 10, the encoder/decoder 4 adds EDC/ECC and applies CIRC processing to the data, and also applies EFM modulation to the data to thereby input the data to the write strategy circuit 3. On the basis of the multi-pulse pattern table set by the control section 5, the write strategy circuit 3 generates a laser power control signal to form pits/lands having a length corresponding to EFM-encoded data input from the encoder/decoder 4, and inputs the signal to the ALPC 2. On the basis of the laser power control signal input from the write strategy circuit 3, the ALPC 2 controls the light emission of the semiconductor laser of the optical system 1 by means of the optimum laser power in accordance with the disk type, recording speed and results of the OPC of that time. In this way, pits are formed on the disk 20, and the data input via the interface 10 is recorded.

The CD-RWs which are recordable optical disks each having different attribute information (disk type information) because of a difference in characteristics among manufactures, but the disk types of CD-RWs are generally classified into low speed media for recording at 1 to 4 times speed, high speed media for recording at 4 to 16 times speed and ultra speed media for recording at 8 to 32 times speed.

Figure 5:
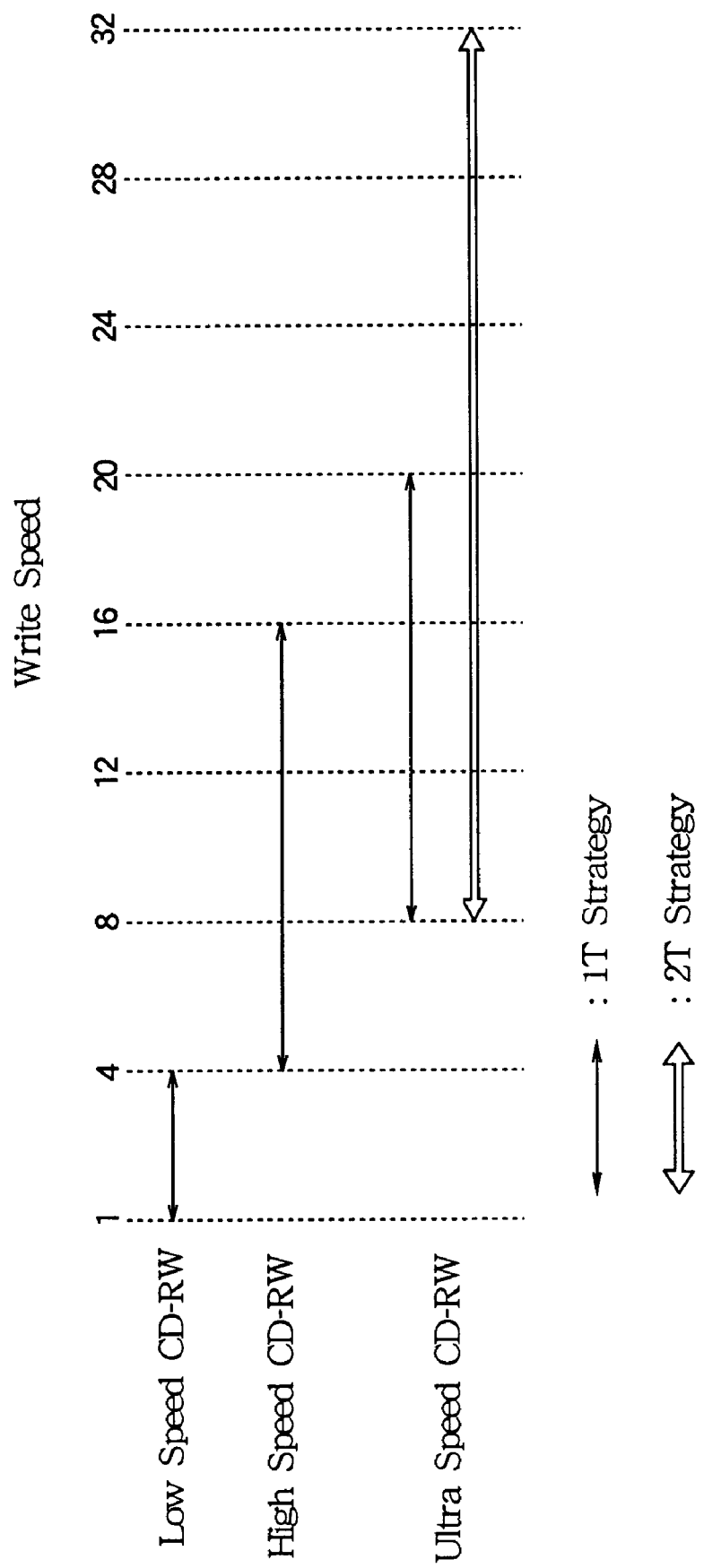
FIG. 5 is a diagram illustrating how the optical disk recording apparatus selects a write strategy in accordance with a disk type and recording speed.

In selecting one of the 1T multi-pulse pattern table or 2T multi-pulse pattern table shown in FIG. 2 and FIG. 3 at s4 in the above flowchart, one of the multi-pulse patterns may be selected in accordance with a selection schedule as shown in FIG. 5, for example. More specifically, in this drawing, since ranges of recording speed are 1 to 4 times and 4 to 16 times in the low speed media and high speed media, the 1T multi-pulse pattern table is selected for disks produced by any manufacturer.

In the case of the ultra speed media, the 2T multi-pulse pattern table is selected for disks produced by any manufacturer, in recording at a recording speed beyond 20 times. However, in recording in the optical disk of the ultra speed media at 8 to 20 times recording speed, information other than the disk type information regarding the "ultra speed media" is referred, and it is decided whether or not to select the 2T multi-pulse pattern table even at this recording speed or to select the 1T multi-pulse pattern table in the range of this recording speed.

In this way, since it is possible to ensure that the semiconductor laser is turned on or off even in the high speed recording by applying the 2T multi-pulse pattern table, that is, the write strategy on a 2T cycle, the power of the laser light actually output from the semiconductor laser can be accurately controlled.

Figure 6:
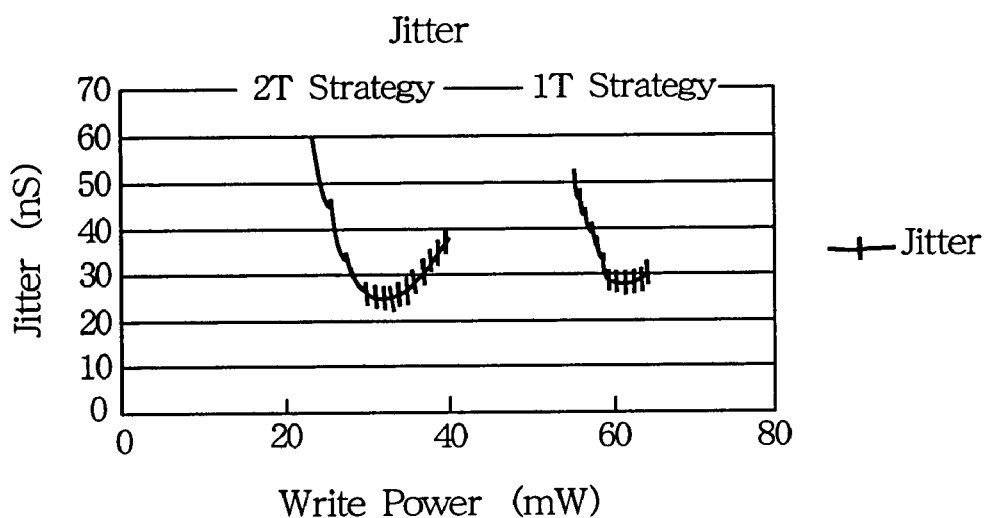
FIGS. 6(A) and 6(B) are graphs showing a relation between a jitter and modulation Amplitude (I11/Itop) in a 1T-cycle write strategy and a 2T-cycle write strategy, respectively, during high-speed recording.
Figure 6:
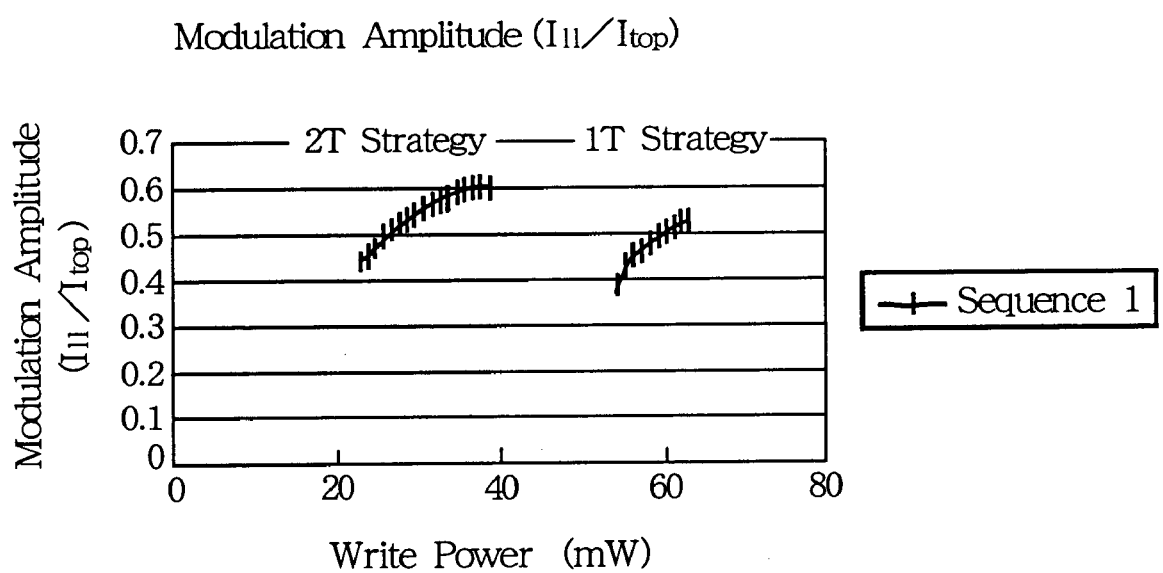
Figure 7:
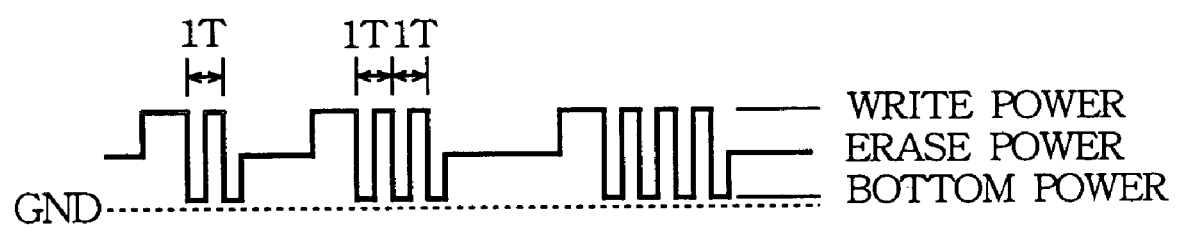
FIGS. 7(A) and 7(B) are a diagram illustrating a write strategy during conventional recording.
Figure 7:
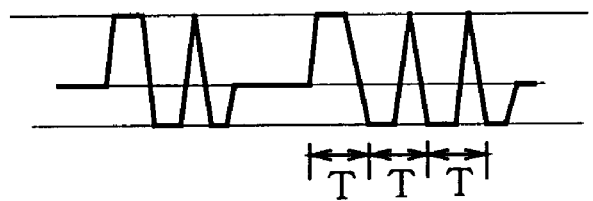

As shown in a jitter change graph and modulation amplitude change graph of FIGS. 6(A) and (B) where recording is performed at 24 times speed, the optimum power in the high speed recording becomes about half of that on a 1T cycle if the write strategy is on a 2T cycle, thus providing such an advantage that a life of the semiconductor laser becomes longer. It also brings such an advantage that a low-powered semiconductor laser and ALPC can be used.

In this embodiment, two kinds of pattern tables based on the 1T cycle and 2T cycle are stored in the memory 2 as the multi-pulse patterns (write strategy), but the cycles for the multi-pulse patterns are not limited to these. In addition, the kind is not limited to two either, and more kinds may be stored.

Furthermore, a multi-pulse pattern table is selected on the basis of both pieces of information regarding the disk type and recording speed in the flowchart of FIG. 4, but a multi-pulse pattern table may be selected on the basis of one piece of information regarding the disk type or the recording speed.

In addition, in the recording method such as CAV, partial CAV or zone CLV, recording speed changes during recording. In this case, the write strategy circuit 3 and the ALPC 2 change a clock cycle (T) or the write power in accordance with the change in the recording speed, but in addition to this, the multi-pulse pattern table set in the write strategy circuit 3 may also be changed dynamically.

More specifically, in this case, the control section 5 always monitors the change in the recording speed during recording, and continuously determines the optimum multi-pulse pattern table corresponding to the recording speed in accordance with the change in the recording speed. When the optimum multi-pulse pattern table is switched to, this optimum multi-pulse pattern table is read from the memory 6 to be set in the write strategy circuit 3.

As described above, the inventive optical disk recording apparatus is designed for forming pits on a recording surface of an optical disk of a given type at a given recording speed by applying a laser light in the form of a sequence of multiple pulses obtained by intermittently turning on and off the laser light according to a given multi-pulse pattern while rotating the optical disk at a constant angular velocity such that a linear velocity of the optical disk varies. In the inventive apparatus, the write strategy circuit is set with a pattern table and controls the turning on and off of the laser light according to said linear velocity and a multi-pulse pattern selected from the pattern table in correspondence to a length of the pit to be formed. The storage section stores a plurality of pattern tables of different kinds, each pattern table containing a plurality of multi-pulse patterns corresponding to a plurality of lengths of the pit. The control section is provided for selecting one of the pattern tables based on either one or both of the recording speed and the type of the optical disk and based on the varying linear velocity of the optical disk, and for reading out the selected pattern table from the storage section and setting the read pattern table in the write strategy circuit.

Furthermore, the optical disk recording apparatus which records data in a CD-RW has been described in this embodiment, but the media are not limited to the CD-RW, and this invention can be applied to any media such as a DVD+RW, DVD-RW, DVD-RAM and Blue Ray disk etc. as far as they are the media in which pits are formed by the multi-pulse method.

Further more, though the optical disk recording apparatus which records data in a CD-RW has been described in this embodiment, the optical disk recording apparatus may store the pattern tables of the multi-pulse patterns that have cycles of turning on and off the laser light ranging 0.5T cycle through 3T cycle, and select one of the pattern tables to be set in the write strategy circuit 3 as described hereinabove. In such a case, the control section may perform different sessions of test recording separately from each other with using the respective multi-pulse patterns having the cycles ranging from 0.5T through 3T to evaluate respective qualities of the different sessions of the test recording before an actual recording, and selects one of the multi-pulse patterns having the cycles ranging from 0.5T through 3T based on the respective qualities evaluated by the different sessions of the test recording. Otherwise, the control section may perform a first test recording with using the 1T pattern table to evaluate a quality of recording and a second test recording with using the 2T pattern table to evaluate a quality of recording separately from the first test recording before performing an actual recording, and selects one of the 1T pattern table and the 2T pattern table based on the respective qualities evaluated by the first test recording and the second test recording.

As described above, according to this invention, a multi-pulse pattern table that is the optimum write strategy can be selected in accordance with the kind of an optical disk such as a CD-RW and the recording speed, so that a good pit can be formed in any media and at any recording speed, and information can be recorded with good quality.

What is claimed is:

1. An optical disk recording apparatus for forming pits on a recording surface of an optical disk of a given type at a given recording speed by applying a laser light in the form of a sequence of multiple pulses obtained by intermittently turning on and off the laser light according to a given multi-pulse pattern, the apparatus comprising:
   a write strategy circuit that is set with a pattern table and controls the turning on and off of the laser light according to a multi-pulse pattern selected from the pattern table in correspondence to a length of the pit to be formed;
   a storage section that stores a plurality of pattern tables of different kinds, each pattern table containing a plurality of multi-pulse patterns corresponding to a plurality of lengths of the pit, each of said plurality of multi-pulse patterns representing a sequence of multiple pulses of laser light for forming a single pit by intermittently turning on and off the laser light; and
   a control section that selects one of the pattern tables based on either one or both of the recording speed and the type of the optical disk, and that reads out the selected pattern table from the storage section and sets the read pattern table in the write strategy circuit.

2. The optical disk recording apparatus according to claim 1, wherein the storage section stores the plurality of the pattern tables in correspondence to a plurality of basic cycles of turning on and off the laser light, such that each pattern table contains the plurality of the multi-pulse patterns, all of which are arranged according to the basic cycle allotted to each pattern table and in matching with the plurality of the lengths of the pit.

3. The optical disk recording apparatus according to claim 2, wherein the storage section stores a 1T pattern table corresponding to a pattern table of the basic cycle of 1T, so that the 1T pattern table enables the write strategy circuit to control the turning on and off of the laser light according to the multi-pulse patterns of the basic cycle of 1T, and stores a 2T pattern table corresponding to a pattern table of the basic cycle of 2T, so that the 2T pattern table enables the write strategy circuit to control the turning on and off of the laser light according to the multi-pulse patterns of the basic cycle of 2T.

4. The optical disk recording apparatus according to claim 1, wherein the control section periodically monitors a change in the recording speed during recording, and selects the pattern table in response to the monitored change of the recording speed to thereby dynamically set the selected pattern table in the write strategy circuit.

5. The optical disk recording apparatus according to claim 4, wherein the control section performs a first test recording with using the 1T pattern table to evaluate a quality of recording and a second test recording with using the 2T pattern table to evaluate a quality of recording separately from the first test recording before performing an actual recording, and selects one of the 1T pattern table and the 2T pattern table based on the respective qualities evaluated by the first test recording and the second test recording.

6. The optical disk recording apparatus according to claim 1, wherein the storage section stores the multi-pulse patterns that have cycles of turning on and off the laser light ranging from 0.5T cycle through 3T cycle.

7. The optical disk recording apparatus according to claim 6, wherein the control section performs different sessions of test recording separately from each other with using the respective multi-pulse patterns having the cycles ranging from 0.5T through 3T to evaluate respective qualities of the different sessions of the test recording before an actual recording, and selects one of the multi-pulse patterns having the cycles ranging from 0.5T through 3T based on the respective qualities evaluated by the different sessions of the test recording.

8. An optical disk recording apparatus for forming pits on a recording surface of an optical disk of a given type at a given recording speed by applying a laser light in the form of a sequence of multiple pulses obtained by intermittently turning on and off the laser light according to a given multi-pulse pattern while rotating the optical disk at a constant angular velocity such that a linear velocity of the optical disk varies, the apparatus comprising:
 a write strategy circuit that is set with a pattern table and controls the turning on and off of the laser light according to a multi-pulse pattern selected from the pattern table in correspondence to a length of the pit to be formed;
 a storage section that stores a plurality of pattern tables of different kinds, each pattern table containing a plurality of multi-pulse patterns corresponding to a plurality of lengths of the pit, each of said plurality of multi-pulse patterns representing a sequence of multiple pulses of laser light for forming a single pit by intermittently turning on and off the laser light; and
 a control section that selects one of the pattern tables based on either one or both of the recording speed and the type of the optical disk and based on the varying linear velocity of the optical disk, and that reads out the selected pattern table from the storage section and sets the read pattern table in the write strategy circuit.

9. The optical disk recording apparatus according to claim 8, wherein the storage section stores the plurality of the pattern tables in correspondence to pattern tables of a plurality of basic cycles of turning on and off the laser light, such that each pattern table contains the plurality of the multi-pulse patterns, all of which are arranged according to the basic cycle allotted to each pattern table and in matching with the plurality of the lengths of the pit.

10. The optical disk recording apparatus according to claim 9, wherein the storage section stores a 1T pattern table corresponding to a pattern table of the basic cycle of 1T, so that the 1T pattern table enables the write strategy circuit to control the turning on and off of the laser light according to the basic cycle of 1T, and stores a 2T pattern table corresponding to a pattern table of the basic cycle of 2T, so that the 2T pattern table enables the write strategy circuit to control the turning on and off of the laser light according to the basic cycle of 2T.

11. The optical disk recording apparatus according to claim 8, wherein the control section periodically monitors a change in the recording speed during recording, and selects the pattern table in response to the monitored change of the recording speed to thereby dynamically set the selected pattern table in the write strategy circuit.

12. The optical disk recording apparatus according to claim 11, wherein the control section performs a first test recording with using the 1T pattern table to evaluate a quality of recording and a second test recording with using the 2T pattern table to evaluate a quality of recording separately from the first test recording before performing an actual recording, and selects one of the 1T pattern table and the 2T pattern table based on the respective qualities evaluated by the first test recording and the second test recording.

13. The optical disk recording apparatus according to claim 8, wherein the storage section stores the multi-pulse patterns that have cycles of turning on and off the laser light ranging from 0.5T cycle through 3T cycle.

14. The optical disk recording apparatus according to claim 13, wherein the control section performs different sessions of test recording separately from each other with using the respective multi-pulse patterns having the cycles ranging from 0.5T through 3T to evaluate respective qualities of the different sessions of the test recording before an actual recording, and selects one of the multi-pulse patterns having the cycles ranging from 0.5T through 3T based on the respective qualities evaluated by the different sessions of the test recording.

15. A method of forming pits on a recording surface of an optical disk of a given type at a given recording speed by applying a laser light in the form of a sequence of multiple pulses obtained by intermittently turning on and off the laser light according to a given multi-pulse pattern, the method comprising:
 a write strategy process settable with a pattern table and capable of controlling the turning on and off of the laser light according to a multi-pulse pattern selected from the pattern table in correspondence to a length of the pit to be formed;
 a storage process of storing a plurality of pattern tables of different kinds in a storage, each pattern table containing a plurality of multi-pulse patterns corresponding to a plurality of lengths of the pit, each of said plurality of multi-pulse patterns representing a sequence of multiple pulses of laser light for forming a single pit by intermittently turning on and off the laser light; and
 a control process of selecting one of the pattern tables based on either one or both of the recording speed and the type of the optical disk, and retrieving the selected pattern table from the storage and setting the read pattern table in the write strategy process.

16. A method of forming pits on a recording surface of an optical disk of a given type at a given recording speed by applying a laser light in the form of a sequence of multiple pulses obtained by intermittently turning on and off the laser light according to a given multi-pulse pattern while rotating the optical disk at a constant angular velocity such that a linear velocity of the optical disk varies relative to a spot of the laser light, the method comprising:

a write strategy process settable with a pattern table and capable of controlling the turning on and off of the laser light according to said linear velocity and a multi-pulse pattern selected from the pattern table in correspondence to a length of the pit to be formed;

a storage process of storing a plurality of pattern tables of different kinds in a storage, each pattern table containing a plurality of multi-pulse patterns corresponding to a plurality of lengths of the pit, each of said plurality of multi-pulse patterns representing a sequence of multiple pulses of laser light effected by intermittently turning on and off the laser light; and a control process of selecting one of the pattern tables based on either one or both of the recording speed and the type of the optical disk and based on the varying linear velocity of the optical disk, and retrieving the selected pattern table from the storage and setting the read pattern table in the write strategy process.

17. A computer-readable medium encoded with a computer program for use in an optical disk recording apparatus designed for forming pits on a recording surface of an optical disk of a given type at a given recording speed by applying a laser light in the form of a sequence of multiple pulses obtained by intermittently turning on and off the laser light according to a given multi-pulse pattern, the program being executable by the optical disk recording apparatus for performing a method comprising:

a write strategy process settable with a pattern table and capable of controlling the turning on and off of the laser light according to a multi-pulse pattern selected from the pattern table in correspondence to a length of the pit to be formed;

a storage process of storing a plurality of pattern tables of different kinds in a storage, each pattern table containing a plurality of multi-pulse patterns corresponding to a plurality of lengths of the pit, each of said plurality of multi-pulse patterns representing a sequence of multiple pulses of laser light for forming a single pit by intermittently turning on and off the laser light; and a control process of selecting one of the pattern tables based on either one or both of the recording speed and the type of the optical disk, and retrieving the selected pattern table from the storage and setting the read pattern table in the write strategy process.

18. A computer-readable medium encoded with a computer program for use in an optical disk recording apparatus designed for forming pits on a recording surface of an optical disk of a given type at a given recording speed by applying a laser light in the form of a sequence of multiple pulses obtained by intermittently turning on and off the laser light according to a given multi-pulse pattern while rotating the optical disk at a constant angular velocity such that a linear velocity of the optical disk varies relative to a spot of the laser light, the program being executable by the optical disk recording apparatus for performing a method comprising:

a write strategy process settable with a pattern table and capable of controlling the turning on and off of the laser light according to a multi-pulse pattern selected from the pattern table in correspondence to a length of the pit to be formed;

a storage process of storing a plurality of pattern tables of different kinds in a storage, each pattern table containing a plurality of multi-pulse patterns corresponding to a plurality of lengths of the pit, each of said plurality of multi-pulse patterns representing a sequence of multiple pulses of laser light for forming a single pit by intermittently turning on and off the laser light; and a control process of selecting one of the pattern tables based on either one or both of the recording speed and the type of the optical disk and based on the varying linear velocity of the optical disk, and retrieving the selected pattern table from the storage and setting the read pattern table in the write strategy process.

19. A system for forming pits on a recording surface of an optical disk of a given type at a given recording speed by applying a laser light in the form of a sequence of multiple pulses obtained by intermittently turning on and off the laser light according to a given multi-pulse pattern, the system comprising:

an optical disk; and a disk recording apparatus, said apparatus comprising:

a write strategy circuit that is set with a pattern table and controls the turning on and off of the laser light according to a multi-pulse pattern selected from the pattern table in correspondence to a length of the pit to be formed, a storage section that stores a plurality of pattern tables of different kinds, each pattern table containing a plurality of multi-pulse patterns corresponding to a plurality of lengths of the pit, each of said plurality of multi-pulse patterns representing a sequence of multiple pulses of laser light for forming a single pit by intermittently turning on and off the laser light, and a control section that selects one of the pattern tables based on either one or both of the recording speed and the type of the optical disk, and that reads out the selected pattern table from the storage section and sets the read pattern table in the write strategy circuit.

20. A system for forming pits on a recording surface of an optical disk of a given type at a given recording speed by applying a laser light in the form of a sequence of multiple pulses obtained by intermittently turning on and off the laser light according to a given multi-pulse pattern while rotating the optical disk at a constant angular velocity such that a linear velocity of the optical disk varies, the apparatus comprising, the system comprising:

an optical disk; and an disk recording apparatus, said apparatus comprising:

a write strategy circuit that is set with a pattern table and controls the turning on and off of the laser light according to a multi-pulse pattern selected from the pattern table in correspondence to a length of the pit to be formed;

a storage section that stores a plurality of pattern tables of different kinds, each pattern table containing a plurality of multi-pulse patterns corresponding to a plurality of lengths of the pit, each of said plurality of multi-pulse patterns representing a sequence of multiple pulses of laser light for forming a single pit by intermittently turning on and off the laser light; and a control section that selects one of the pattern tables based on either one or both of the recording speed and the type of the optical disk and based on the varying linear velocity of the optical disk, and that reads out the selected pattern table from the storage section and sets the read pattern table in the write strategy circuit.

* * * * *